(12) United States Patent
Kim et al.

(10) Patent No.: US 9,359,226 B2
(45) Date of Patent: Jun. 7, 2016

(54) REGENERABLE FILTER UNIT, REGENERABLE FILTER SYSTEM INCLUDING THE SAME, AND METHOD OF OPERATING REGENERABLE FILTER SYSTEM

(75) Inventors: Chang Hyun Kim, Seoul (KR); Hyun Seok Kim, Seoul (KR); Hyo Rang Kang, Anyang-si (KR); Ho Jung Yang, Suwon-si (KR); Joo Wook Lee, Seoul (KR); Bok Soon Kwon, Seoul (KR); Jae Eun Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 947 days.

(21) Appl. No.: 13/230,168

(22) Filed: Sep. 12, 2011

(65) Prior Publication Data

US 2012/0234763 A1    Sep. 20, 2012

(30) Foreign Application Priority Data

Mar. 14, 2011 (KR) ........................ 10-2011-0022293

(51) Int. Cl.
*B01D 61/00* (2006.01)
*C02F 1/28* (2006.01)
(Continued)

(52) U.S. Cl.
CPC ................ *C02F 1/283* (2013.01); *B01D 61/00* (2013.01); *B01D 61/445* (2013.01); *B01J 20/02* (2013.01);
(Continued)

(58) Field of Classification Search
CPC ........ B01D 61/46; B01D 61/48; B01D 61/54; B01D 15/00; B01D 15/09; B01D 61/00; B01D 61/14; B01D 61/42; B01D 61/422; B01D 61/425; B01D 61/427; B01D 61/44; B01D 57/02; B01D 59/38; B01D 59/40; B01D 59/42; C02F 1/469; C02F 1/4693; C02F 1/4695; C02F 1/4696; C02F 1/4698; C02F 1/46; C02F 1/461; C02F 1/46104; C02F 1/46109; C02F 1/46114
USPC .......... 205/630, 631, 632, 633, 634; 210/630, 210/631, 632, 633, 634, 660, 681, 767, 210/748.01
See application file for complete search history.

(56) References Cited

U.S. PATENT DOCUMENTS 5,211,823 A * 5/1993 Giuffrida et al. ............. 204/534
5,858,191 A * 1/1999 DiMascio et al. ............ 204/524
(Continued)

FOREIGN PATENT DOCUMENTS

CN    10 1007267    8/2007
EP    2 287 117    2/2011
(Continued)

OTHER PUBLICATIONS

Search Report dated Jul. 26, 2012 by the European Patent Office for Application No. 11192179.7.
(Continued)

*Primary Examiner* — Allison Fitzsimmons
(74) *Attorney, Agent, or Firm* — Harness, Dickey & Pierce, P.L.C.

(57) ABSTRACT

A filter unit may include an electrode structure, a fluid-purifying flow path, and a pH adjusting chamber. The electrode structure may include a cathode, a cation exchange membrane, an anion exchange membrane, and an anode in that order. The fluid-purifying flow path may be at least one of a path in the cathode, between the cathode and the cation exchange membrane, between the anion exchange membrane and the anode, and in the anode. The fluid-purifying flow path may include an adsorption function. The pH adjusting chamber may be between the cation exchange membrane and the anion exchange membrane. The pH adjusting chamber may be configured to control the pH of the fluid in the fluid-purifying flow path.

17 Claims, 10 Drawing Sheets

(51) Int. Cl.

| | |
|---|---|
| B01D 61/44 | (2006.01) |
| B01J 20/06 | (2006.01) |
| B01J 20/08 | (2006.01) |
| B01J 20/10 | (2006.01) |
| B01J 20/12 | (2006.01) |
| B01J 20/18 | (2006.01) |
| B01J 20/20 | (2006.01) |
| B01J 20/32 | (2006.01) |
| B01J 20/34 | (2006.01) |
| C02F 1/461 | (2006.01) |
| C02F 1/469 | (2006.01) |
| B01J 20/02 | (2006.01) |
| B01J 20/28 | (2006.01) |
| B82Y 30/00 | (2011.01) |
| B01J 47/08 | (2006.01) |
| B01J 49/00 | (2006.01) |
| C02F 1/00 | (2006.01) |
| C02F 1/42 | (2006.01) |
| C02F 1/66 | (2006.01) |
| C02F 101/10 | (2006.01) |
| C02F 101/12 | (2006.01) |
| C02F 101/20 | (2006.01) |
| C02F 101/36 | (2006.01) |

(52) U.S. Cl.
CPC  *B01J 20/06* (2013.01); *B01J 20/08* (2013.01); *B01J 20/10* (2013.01); *B01J 20/12* (2013.01); *B01J 20/18* (2013.01); *B01J 20/20* (2013.01); *B01J 20/205* (2013.01); *B01J 20/28007* (2013.01); *B01J 20/3204* (2013.01); *B01J 20/3234* (2013.01); *B01J 20/3416* (2013.01); *B01J 20/3433* (2013.01); *B01J 20/3441* (2013.01); *B01J 47/08* (2013.01); *B01J 49/0052* (2013.01); *B82Y 30/00* (2013.01); *C02F 1/28* (2013.01); *C02F 1/469* (2013.01); *C02F 1/46104* (2013.01); *B01D 2311/2626* (2013.01); *B01D 2313/345* (2013.01); *B01D 2313/36* (2013.01); *B01D 2313/40* (2013.01); *B01J 2220/42* (2013.01); *C02F 1/281* (2013.01); *C02F 1/285* (2013.01); *C02F 1/288* (2013.01); *C02F 1/42* (2013.01); *C02F 1/66* (2013.01); *C02F 2001/46119* (2013.01); *C02F 2101/103* (2013.01); *C02F 2101/12* (2013.01); *C02F 2101/20* (2013.01); *C02F 2101/36* (2013.01); *C02F 2201/003* (2013.01); *C02F 2201/4615* (2013.01); *C02F 2201/4618* (2013.01); *C02F 2201/46115* (2013.01); *C02F 2201/46135* (2013.01); *C02F 2201/46145* (2013.01); *C02F 2209/05* (2013.01); *C02F 2301/08* (2013.01); *C02F 2303/16* (2013.01); *C02F 2305/08* (2013.01)

(56) References Cited

U.S. PATENT DOCUMENTS

| | | | |
|---|---|---|---|
| 7,473,369 B2 | 1/2009 | Meng et al. | |
| 2001/0042682 A1 | 11/2001 | Weres et al. | |
| 2005/0098436 A1* | 5/2005 | Miwa et al. | 204/632 |
| 2005/0103630 A1 | 5/2005 | Ganzi et al. | |
| 2005/0263457 A1* | 12/2005 | Wilkins et al. | 210/663 |
| 2009/0008267 A1 | 1/2009 | Del Signore | |
| 2010/0133115 A1* | 6/2010 | Gifford | B01D 61/422 205/746 |

FOREIGN PATENT DOCUMENTS

| | | |
|---|---|---|
| JP | 55-159893 | 12/1980 |
| JP | 11047505 A | 2/1999 |
| JP | 2003-080065 | 3/2003 |
| JP | 2007-332537 | 12/2007 |
| KR | 20040103625 A | 12/2004 |

OTHER PUBLICATIONS

Drouiche, N. et al.—"Electrodialysis with Bipolar Membrane for Regeneration of a Spent Activated Carbon"—Journal of Hazardous Materials, Elsevier, Amsterdam, NL—Oct. 15, 2009.
Matthew J. DeMarco et al., Water research 37 (2003) 164, "Arsenic Removal Using a Polymeric/Inorganic Hybrid Sorbent".
Jack Hine, J. Am. Chem. Soc. (1950), "A Mechanism for Substitution Reactions at a Saturated Carbon Atom".
J. Phys. Chem. C. 113 (2009) 21679, "Influence of pH on Initial Concentration Effect of Arsenate Adsorption on $TiO_2$ Surfaces: Thermodynamic, DFT, and EXAFS Interpretations".

* cited by examiner

Water-purifying Step    Regeneration Step

PH<8.0    PH>11.0

REGENERABLE FILTER UNIT, REGENERABLE FILTER SYSTEM INCLUDING THE SAME, AND METHOD OF OPERATING REGENERABLE FILTER SYSTEM

CROSS-REFERENCE TO RELATED APPLICATION

This application claims priority under 35 U.S.C. §119 to Korean Patent Application No. 10-2011-0022293, filed in the Korean Intellectual Property Office on Mar. 14, 2011, the entire contents of which are incorporated herein by reference.

BACKGROUND

1. Field

Various example embodiments relate to a regenerable filter unit, a filter system, and a method of operating the same. More particularly, various example embodiments relate to an in-situ regenerable filter unit, a filter system, and a method of operating the same.

2. Description of the Related Art

Rapid industrialization is aggravating the pollution of water sources such as underground water, surface water, and the like. Particularly, an element such as arsenic (As) which may present a fatal level of toxicity to humans may be in the underground water, surface water, and the like.

Polluted water may be taken and purified in a water purifying plant and then supplied to homes. However, in the chlorine disinfection step during the water-purifying process, chlorine and organic material in the water react. As a result, chlorine disinfection by-products such as chloroform may be produced. Such by-products may not be completely removed and may remain in the water supplied to homes. Furthermore, during the supply of water to users, heavy metals such as copper (Cu), lead (Pb), zinc (Zn), cadmium (Cd), and the like which are corroded/eluted from a superannuated water supply pipe may be included in the water.

However, since most filters used in the water-purifying technology are consumable parts, periodic replacement is required, thereby generating added costs and inconvenience to users. The replaced filter should also be discarded, thus causing another environmental problem.

SUMMARY

Various embodiments relate to a regenerable and environmentally-friendly filter unit with reduced maintenance cost for users.

Various embodiments relate to a filter system that may regenerate a filter unit in-situ without decomposition of the system.

Various embodiments relate to a method of driving a filter system that may regenerate a filter unit in-situ without decomposition of the system.

According to an example embodiment, a filter unit may include an electrode structure including a cathode, a cation exchange membrane, an anion exchange membrane, and an anode disposed in that order; a fluid-purifying flow path (e.g., water-purifying flow path) being at least one of a path in the cathode, between the cathode and the cation exchange membrane, between the anion exchange membrane and the anode, and in the anode, the fluid-purifying flow path including an adsorption function; and a pH adjusting chamber defined between the cation exchange membrane and the anion exchange membrane, the pH adjusting chamber configured to control the pH of the water-purifying flow path.

According to another example embodiment, a filter system may include the filter unit and a voltage applier to the cathode and the anode.

According to another example embodiment, a method of driving a filter system may include passing inflow water in a water-purifying flow path of a filter unit so as to purify water without applying a voltage, the filter unit including an electrode structure including a cathode, a cation exchange membrane, an anion exchange membrane, and an anode disposed in that order, a water-purifying flow path being at least one of a path in the cathode, between the cathode and the cation exchange membrane, between the anion exchange membrane and the anode, and in the anode, the fluid-purifying flow path including an adsorption function, and a pH adjusting chamber between the cation exchange membrane and the anion exchange membrane, and the pH adjusting chamber configured to control the pH of the water-purifying flow path; and regenerating the water-purifying flow path by applying a voltage to the cathode and the anode and supplying water to the whole inside of the electrode structure.

At least one sub-electrode structure may be further included between the cation exchange membrane and the anion exchange membrane, wherein the sub-electrode structure may include an anion exchange membrane, a bipolar membrane, and a cation exchange membrane disposed in that order, and a water-purifying flow path that is formed as at least one path between the anion exchange membrane and the bipolar membrane, and between the bipolar membrane and the cation exchange membrane, the fluid-purifying flow path including an adsorption function.

The cathode and the anode may be formed of material that may induce a water decomposition reaction.

The adsorption function may be provided by an adsorbent filled in the water-purifying flow path, when the water-purifying flow path is at least one of a path between the cathode and the cation exchange membrane, between the anion exchange membrane and the anode, between the anion exchange membrane and the bipolar membrane, and between the bipolar membrane and the cation exchange membrane; and the cathode and the anode may be formed of porous material including a flow path through which inflow water may pass. When the water-purifying path is formed in at least one of the cathode and the anode, the adsorption function may be provided by the adsorption properties of the cathode and the anode or by an adsorbent supported on the surfaces or in the pores of the cathode and the anode.

The adsorbent contacting the cathode or supported in the cathode may desorb pollutant under a basic condition The adsorbent contacting the anode or supported in the anode may desorb pollutant under an acidic condition.

The voltage may induce water decomposition in the cathode and anode.

In the regenerating step, an electrolyte capable of supplying ions required for pH control may be supplied to the pH adjusting chamber.

DETAILED DESCRIPTION

Figure 1:
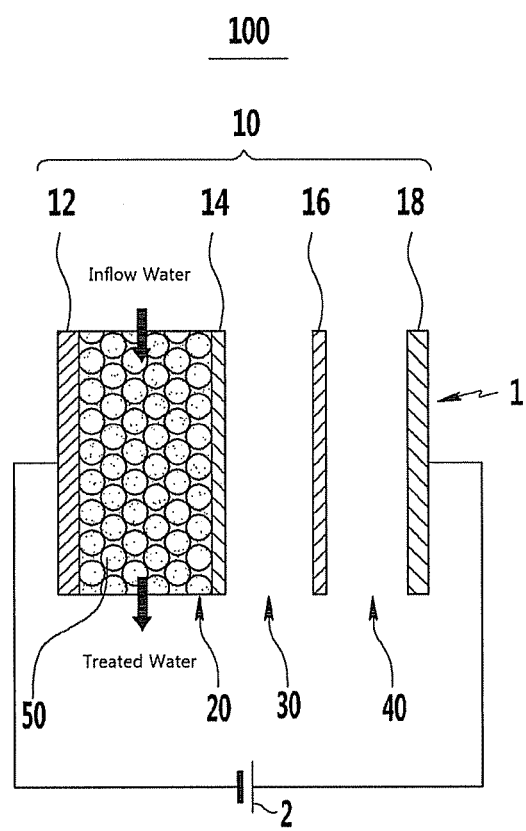
FIG. 1 is a schematic diagram of a filter system according to an example embodiment.

The advantages and characteristics described herein, and the method of achieving them, may be more clearly understood with reference to the accompanying drawings and example embodiments. However, it should be understood that the disclosure is not limited to the following examples and may be realized with different embodiments. The present example embodiments have merely been provided to ensure the completeness of the disclosure and to aid the understanding of a person having ordinary knowledge in the art to fully understand the scope of the disclosure as defined by the claims. Thus, in some example embodiments, well-known technologies may not have been specifically explained in the interest of brevity. Unless otherwise defined, all terms used in the specification (including technical and scientific terms) may be used as meanings commonly understood to a person having ordinary knowledge in the art. Furthermore, unless explicitly stated, the terms defined in a dictionary are not to be interpreted in a manner that would be repugnant to their generally-accepted meanings. In addition, unless explicitly described to the contrary, the words "include" and "comprise" and variations such as "includes," "including," "comprises," and "comprising" will be understood to imply the inclusion of the stated elements but not the exclusion of other unstated elements. Unless specifically described to the contrary, a singular form may include a plural form. The example embodiments described in the specification are explained with reference to idealistic drawings of schematic diagrams. Therefore, the parts shown in the drawings may have outline properties and they are not to limit the categories of the disclosure. The same reference numerals designate the same constituent elements throughout the specification The filter system according to an example embodiment may include a filter unit that provides a space capable of independently forming a basic and/or an acidic condition by electrochemical water decomposition. A fluid purifying flow path (e.g., water-purifying flow path) to which adsorbed material (e.g., pollutants) may be attached and from which adsorbed material may be desorbed under basic and/or acidic condition is included in the above space. By the above constitution, the water-purifying step may be performed by adsorption, and the regeneration step may be performed in-situ by an electrochemical method. Specifically, since the filter unit may be in-situ regenerated and used again without decomposition of the filter system, life-span of the filter may be increased and the maintenance cost to users may be reduced. And, since the water-purifying step is performed by an adsorption method and only the regeneration step is performed by an electrochemical method, the range of inflowing water that may be treated may be expanded, and electrical consumption may be minimized. Although the purification of water is used an as example, it should be understood that the purification of other fluids are also possible based on the approach set forth in the disclosure. Hereinafter, the example embodiments will be explained in more detail with reference to the drawings.

FIG. 1 is a schematic diagram of a filter system 100 according to an example embodiment.

Referring to FIG. 1, the filter system 100 includes a filter unit 1 and a voltage applier 2. The filter unit 1 includes an electrode structure 10 including a cathode 12, a cation exchange membrane 14, an anion exchange membrane 16, and an anode 18 disposed in that order. The electrode structure 10 defines a water-purifying flow path 20, a pH adjusting chamber 30, and an anode chamber 40.

FIG. 1 illustrates a regenerable filter system 100 under a basic condition. Thus, the water-purifying flow path 20 of the filter system 100 may be formed in a space that may compose a basic condition between the cathode 12 and the cation exchange membrane 14. The water-purifying flow path 20 includes an adsorption function capable of adsorbing heavy metals or chlorine disinfection by-products, and the like, existing in water. The adsorption function may be provided by an adsorbent 50 filled in the water-purifying flow path 20. The adsorbent 50 that may be filled in the water-purifying flow path 20 between the cathode 12 and the cation exchange membrane 14 may be an adsorbent that may desorb adsorbed pollutants under a basic condition. Specific example of the pollutants may include an organic material such as humic acid or fulvic acid, a chlorine disinfection by-product such as chloroform, arsenic ions, and the like. Thus, the adsorbent 50 may include activated carbon, relatively high specific surface area graphite (HSAG), carbon nanotubes (CNT), mesoporous carbon, activated carbon fiber, ion exchange resin, zeolite, smectite, vermiculite, and combinations thereof, although example embodiments are not limited thereto. The adsorbent 50 may adsorb pollutants (e.g., an organic material, chlorine disinfection by-products) on its surface and/or in its pores. Furthermore, the adsorbent 50 may include iron oxide, titanium oxide, aluminum oxide, manganese oxide, yttrium oxide, molybdenum oxide, cobalt oxide, nickel oxide, copper oxide, zinc oxide, zirconium oxide, ruthenium oxide, tin oxide, carbon, and an alloy or a mixture thereof, which includes a surface functional group capable of adsorbing arsenic existing in the form of oxyanions such as trivalent or hexavalent $H_3AsO_3$, $H_2AsO_4^-$, $HAsO_4^{2-}$, and the like in water. The adsorbent 50 may be coated on the cathode 12 in the form of nanoparticles or deposited in the form of a thin film.

By adopting an electrode structure 10 including a cation exchange membrane 14 and an anion exchange membrane 16 disposed between a cathode 12 and an anode 18, when a voltage is applied to the electrode structure 10 through a voltage applier 2 so that when water is decomposed, the $OH^-$ produced in the cathode 12 and the $H^+$ produced in the anode 18 may be isolated from each other to prevent neutralization thereof. Thus, a basic condition may be composed in a water-purifying flow path 20 between the cathode 12 and the cation exchange membrane 14, and an acidic condition may be composed in an anode chamber 40 between the anion exchange membrane 16 and the anode 18. Specifically, the pH adjusting chamber 30 isolates OH⁻ produced in the cathode 12 and H⁺ produced in the anode 18 to prevent neutralization thereof so as to control the pH of the water-purifying flow path 20 in the regeneration step. Further, an electrolyte may be additionally supplied to the pH adjusting chamber 30 so that water decomposition may occur more effectively. The electrolyte may be any suitable material that may adequately supply the ions required for pH control to the water-purifying flow path 20.

The cathode 12 and the anode 18 may include a material that may induce a water decomposition reaction. If the cathode 12 and the anode 18 include a material that may induce a water decomposition reaction, a relatively low water decomposition voltage may be applied compared to an electrode formed of an inert material, thus decreasing resistance of the filter unit 1. The cathode 12 and the anode 18 may include a metal, a metal oxide, stainless steel, vitreous carbon, graphite, carbon black, and a combination thereof. The combination may refer to a mixture, a stacking structure, etc. of two or more components. The metal may include platinum (Pt), titanium (Ti), ruthenium (Ru), silver (Ag), gold (Au), iridium (Ir), palladium (Pd), cobalt (Co), vanadium (V), iron (Fe), and a combination thereof. The combination may refer to a mixture, an alloy, a stacking structure, etc. of two or more metals. The metal oxide may include $PtO_2$, $IrO_2$, $TiO_2$, $CaTiO_3$, $NaWO_3$, $MnO_2$, $RuO_2$, $PbO_2$, and a combination thereof. The combination may refer to a mixture, a stacking structure, etc. of two or more metal oxides.

As the cation exchange membrane 14 and the anion exchange membrane 16, various exchange membranes that are well-known to a person having ordinary knowledge in the art may be used, and thus they are not specifically explained in the interest of brevity.

Figure 2:
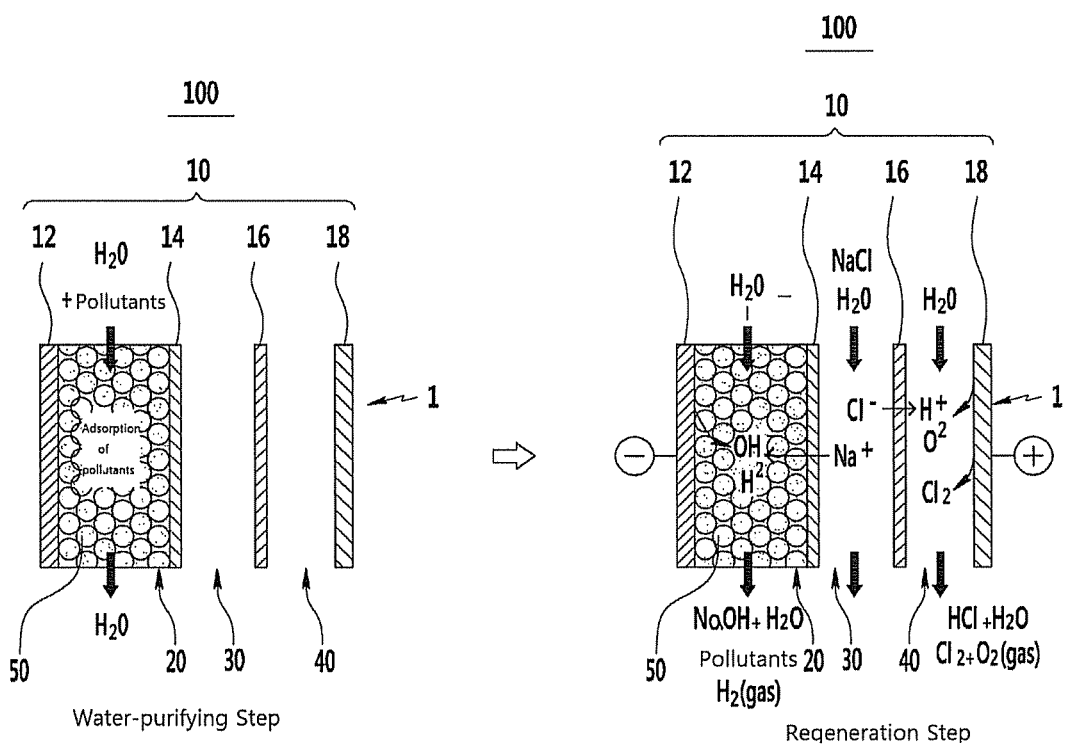
FIG. 2 is a schematic diagram illustrating a method of driving a filter system according to an example embodiment.

FIG. 2 is a schematic diagram illustrating a method of driving a filter system 100 according to an example embodiment.

Referring to FIG. 2, in the water-purifying step, pollutants in the inflow water are removed by adsorption without applying a voltage to the filter system 100. Specifically, if the inflow water passes through the water-purifying flow path 20 filled with an adsorbent 50, the pollutants may be adsorbed to the adsorbent 50 while the treated water may be discharged. For example, an organic material, chlorine disinfection by-products, etc. may be physically and/or chemically adsorbed to the adsorbent 50. In a non-limiting embodiment, arsenic ions in the form of oxyanions may be adsorbed to (e.g., react with) the surface oxygen atoms of the adsorbent 50 while forming a surface complex such as a hydrogen bonding complex, a monodentate mononuclear (MM) complex, a bidentate binuclear (BB) complex, etc.

As the water-purifying step progresses, pollutants are adsorbed to the adsorbent 50. Once the pollutant removal speed decreases, a regeneration step may begin. In the regeneration step, a negative (−) voltage and a positive (+) voltage are respectively applied to the cathode 12 and the anode 18 through the voltage applier (2 in FIG. 1), and water is supplied to (e.g., the entire interior of) the electrode structure 10 so that an electrochemical water decomposition reaction may occur. Specifically, unlike the water-purifying step, water is supplied to the pH adjusting chamber 30 and the anode chamber 40 between the anion exchange membrane 16 and the anode 18, as well as to the water-purifying flow path 20. The applied voltage may be a voltage that may induce water decomposition, for example about 1.23 V or more. In a non-limiting embodiment, about 2 V to about 30 V of voltage may be applied. The following Reaction Scheme 1 represents a water decomposition reaction occurring in the cathode 12, and Reaction Scheme 2 represents a water decomposition reaction occurring in the anode 18.

$$2H_2O(l)+2e^-\rightarrow H_2(g)+2OH^-(aq)$$

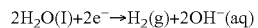  [Reaction Scheme 1]

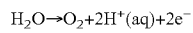  [Reaction Scheme 2]

As shown in the above Reaction Scheme 1, pH of the water-purifying flow path 20 changes to a basic condition due to the OH⁻ produced in the cathode 12. Since the OH⁻ produced in the cathode 12 and H⁺ produced in the anode 18 are isolated from each other due to the pH adjusting chamber 30 defined by the cation exchange membrane 14 and the anion exchange membrane 16, the solution in the water-purifying flow path 20 gradually changes from a weak base to a strong basic condition as the water decomposition reaction progresses. Thus, pH may be controlled by controlling the value of the applied voltage and application time. Under such basic condition, pollutants attached to the adsorbent 50 filled in the water-purifying flow path 20 are desorbed and discharged from the adsorbent 50 by a competing reaction. If necessary, an electrolyte that may supply ions required for pH control of the water-purifying flow path 20 may be additionally supplied to the pH adjusting chamber 30. As the electrolyte, those that do not generate precipitation, are not heavy metals, and do not include acidic ions disturbing pH control of the water-purifying flow path may be used. For example, sodium chloride, sodium sulfate, sodium carbonate, sulfuric acid, potassium nitrate, etc. may be used. The flow rate of the inflow water introduced in the pH adjusting chamber 30 may be controlled to be larger than the flow rate of the inflow water introduced in the water-purifying flow path 20 and the anode chamber 40. This is to supply equal or more ions than the OH⁻ produced in the cathode 12, thereby controlling the pH of the water-purifying flow path 20 to a desired state.

The following Reaction Scheme 3 represents a mechanism of chloroform desorption under a basic condition.

[Reaction Scheme 3]

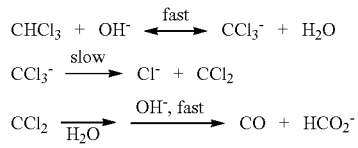

Figure 3:
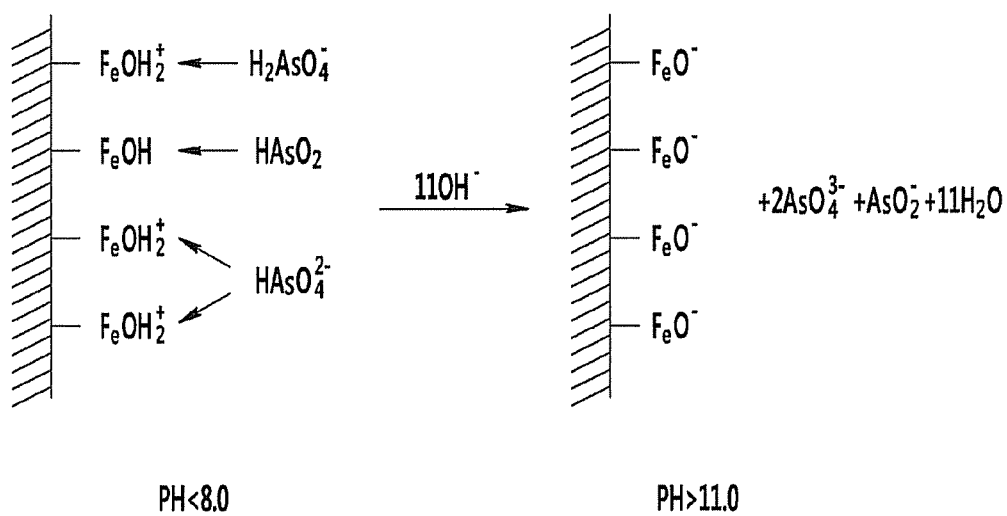
FIG. 3 is a schematic diagram showing a mechanism by which arsenic ions in the form of oxyanions are desorbed under a basic condition with iron oxide as an adsorbent.

FIG. 3 shows a mechanism by which arsenic ions in the form of oxyanions are desorbed under a basic condition with iron oxide as an adsorbent 50. As shown in the above Reaction Scheme 3 and FIG. 3, chloroform or arsenic ions in the form of oxyanions, etc., may be desorbed with relative ease from the adsorbent 50 if a basic condition of about pH 11 or more is composed. Thus, the filter system 100 according to an example embodiment may perform a water-purifying step and an in-situ regeneration step without decomposition of the filter system 100.

The beginning of the regeneration step may be performed according to a determined or desired cycle, or it may be performed according to the results of measurement or monitoring of the flow rate of treated water, flow speed of treated water, and/or the concentration of pollutants in treated water.

For real time measurement or monitoring, the filter system 100 may further include a sensor or a monitoring system that may detect fluidic characteristics of the treated water.

If the filter system 100 is regenerated in this way, it may be semipermanently used and the maintenance cost may be reduced.

Figure 4:
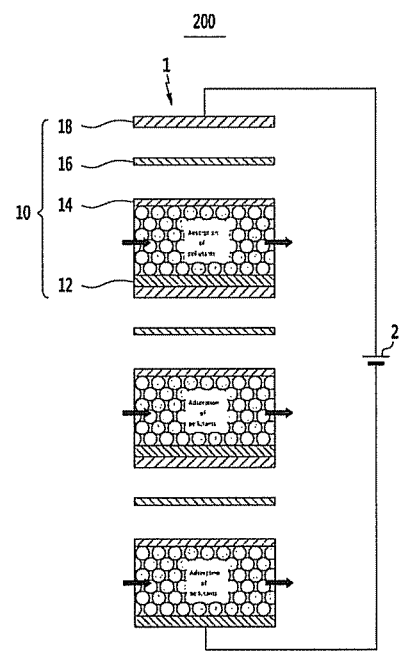
FIG. 4 is a schematic diagram of a filter system according to another example embodiment.
Figure 5:
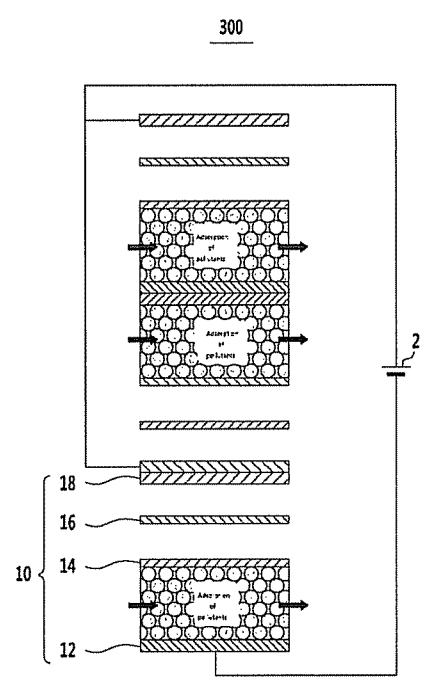
FIG. 5 is a schematic diagram of a filter system according to another example embodiment.
Figure 6:
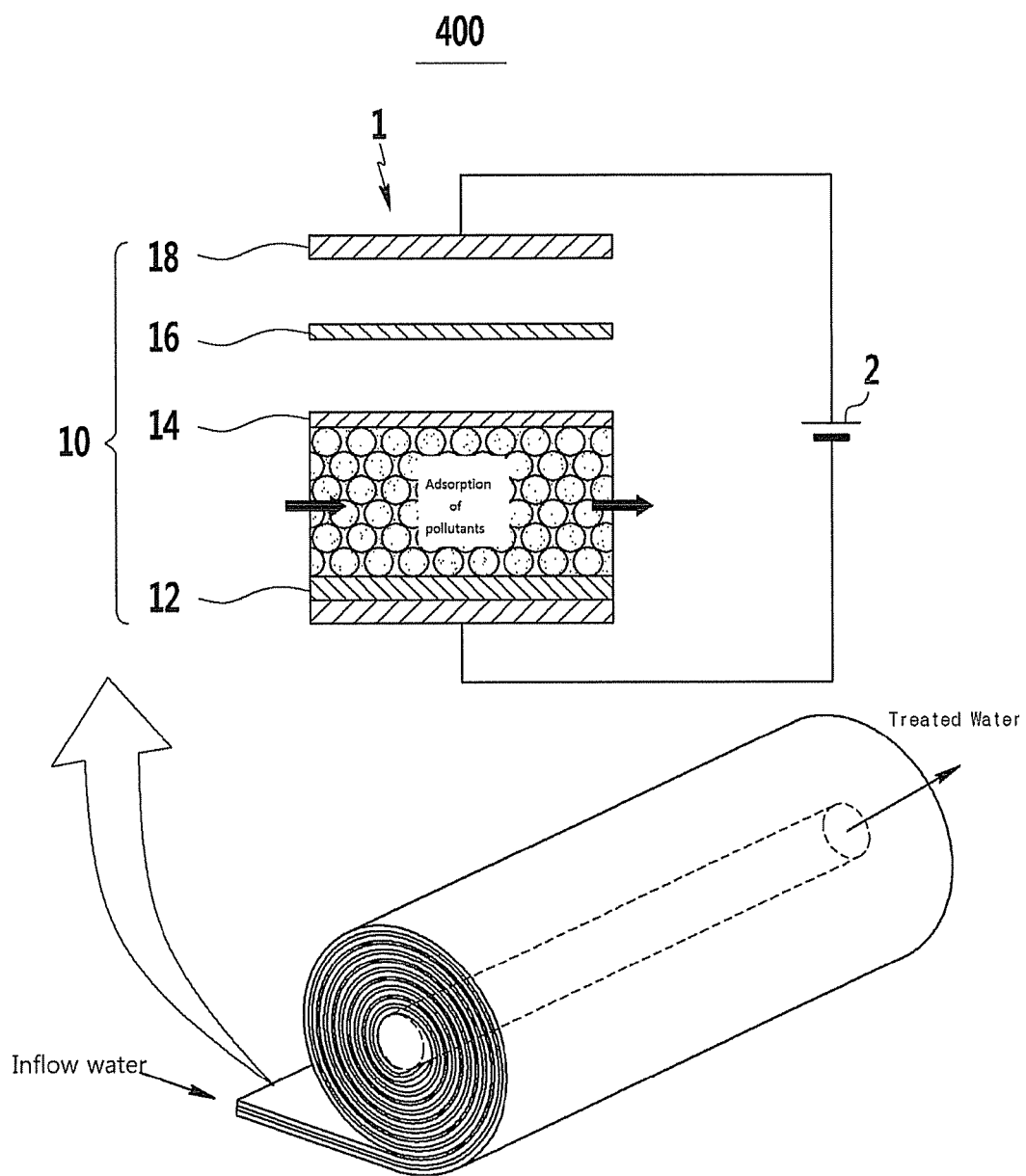
FIG. 6 is a schematic diagram of a filter system according to another example embodiment.

FIG. 4 to FIG. 6 are schematic diagrams of filter systems 200, 300, and 400 according to another example embodiment. FIG. 4 and FIG. 5 show systems 200 and 300 including a stacked filter units formed by stacking a plurality of the filter units 1. FIG. 4 illustrates a filter system 200 wherein a plurality of the filter units 1 are deposited in series, and FIG. 5 shows a filter system 300 wherein a plurality of the filter units 1 are deposited in parallel. FIG. 6 illustrates a filter system 400 of a tube shape manufactured by helically winding the filter unit 1. Inflow water is introduced in a direction indicated by the arrow, and the treated water is discharged to a hollow space of the tube. The stacked filter systems 200 and 300 or the tube shaped filter system 400 are used to increase throughput of the inflow water per unit hour. It should also be understood that the filter systems 200 and 300 may be rolled into the tube shape shown in FIG. 6.

Figure 7:
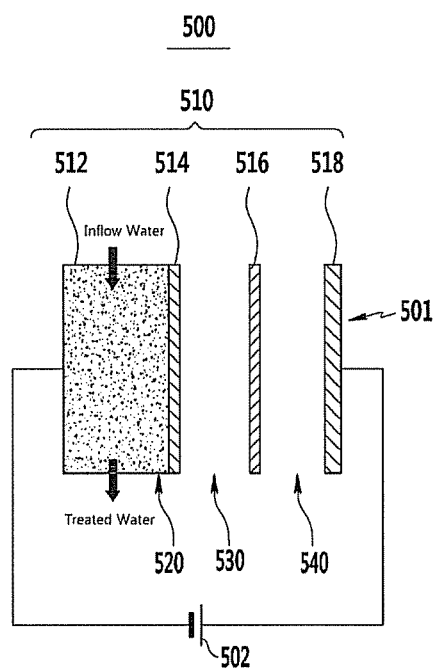
FIG. 7 is a schematic diagram of a filter system according to another example embodiment.

FIG. 7 is a schematic diagram of a filter system according to another example embodiment.

Referring to FIG. 7, a filter system 500 according to another example embodiment includes a filter unit 501 and a voltage applier 502. The filter unit 501 includes an electrode structure 510 consisting of a cathode 512, a cation exchange membrane 514, an anion exchange membrane 516, and an anode 518 disposed in that order. The electrode structure 510 defines a water-purifying flow path 520, a pH adjusting chamber 530, and an anode chamber 540. The filter unit 501 of the filter system 500 shown in FIG. 7 differs from the filter unit 1 of the filter system 100 shown in FIG. 1 in that the water-purifying flow path 520 is formed in the cathode 512.

The cathode 512 may be formed of a porous material through which inflow water may pass so as to provide a water-purifying flow path 520. Furthermore, the cathode 512 and the anode 518 may be formed of a material capable of applying an electric current and facilitating water decomposition. The adsorption function of the water-purifying flow path 520 may be provided by the property of the cathode 512 itself or it may be provided by the adsorbent supported on the surface or in the pores of the cathode 512 (not shown). For example, if the cathode 512 is composed of carbon-based material particles having a particle diameter of about 0.1 to 50 μm, an adsorption function may be provided by the property of the cathode 512 itself, and simultaneously a water-purifying flow path 520 may be composed. In another non-limiting embodiment, if the cathode 512 is composed of a material wherein an adsorbent is supported in the pores of a porous electrode having an average pore size of about 0.1 to 30 μm, an adsorption function may be provided, and simultaneously a water-purifying flow path 520 may be composed.

As the adsorbent, any adsorbents mentioned in the above-explained filter system 100 according to an example embodiment may be used as long as it may be supported in the pores. In the case of the filter unit 501 shown in FIG. 7, since the water-purifying flow path 520 may be formed all over the cathode 512, the pollutant adsorption capacity may be maximally utilized. Therefore, if the pollutant removal rate may be increased or the same removal rate may be secured, the filter unit 501 may be formed more thinly.

Figure 8:
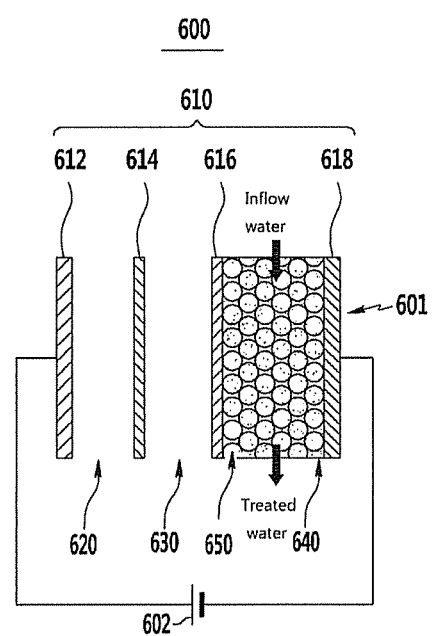
FIG. 8 is schematic diagram of a filter system according to another example embodiment.

FIG. 8 is a schematic diagram of a filter system 600 according to another example embodiment. The filter system 600 includes a filter unit 601 and a voltage applier 602. The filter unit 601 includes an electrode structure 610 consisting of a cathode 612, a cation exchange membrane 614, an anion exchange membrane 616, and an anode 618 disposed in that order. The electrode structure 610 defines a cathode chamber 620, a pH adjusting chamber 630, and a water-purifying flow path 640.

FIG. 8 illustrates a regenerable filter system 600 under an acidic condition. Therefore, the water-purifying flow path 640 of the filter system 600 may be formed in a space that may have an acidic condition between the anion exchange membrane 616 and the anode 618. The water-purifying flow path 640 includes an adsorption function such that it is capable of adsorbing heavy metals existing in the water. The adsorption function may be provided by an adsorbent 650 filled in the water-purifying flow path 640. The adsorbent 650 that may be filled in the water-purifying flow path 640 between the anion exchange membrane 616 and the anode 618 may be an adsorbent that is capable of desorbing adsorbed pollutants under an acidic condition. Specific example of the pollutants may include metals such as lead (Pb). Therefore, the adsorbent 650 may include activated carbon, relatively high specific surface area graphite (HSAG), carbon nanotubes (CNT), mesoporous carbon, activated carbon fiber, ion exchange resin (e.g., cation exchange resin), zeolite, smectite, vermiculite, and combinations thereof, although example embodiments are not limited thereto. The adsorbent 650 may adsorb pollutants (e.g., unwanted metals) on its surface and/or in its pores.

The other constituent elements may be substantially equivalent to those of the filter system 100 explained with reference to FIG. 1, and thus, the explanations have been omitted in the interest of brevity.

Although not shown in FIG. 8, under an acidic condition, the regenerable filter system 600 may be modified such that a water-purifying flow path may be formed in the anode 618 itself, similar to the filter system 500 explained with reference to FIG. 7.

Figure 9:
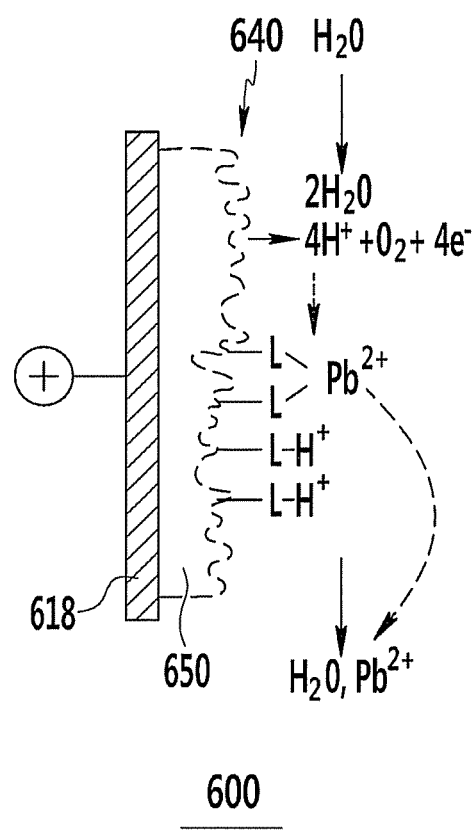
FIG. 9 is a schematic diagram for explaining the regeneration mechanism of a filter system according to another example embodiment.

FIG. 9 is a schematic diagram for explaining the regeneration mechanism of a filter system according to another example embodiment. In FIG. 9, lead is shown as a pollutant.

If a voltage is applied to the cathode 612 and the anode 618 through the voltage applier 602 after the water-purifying step, a water decomposition reaction is induced in the cathode 612 and the anode 618. At this time, $H^+$ ions are produced on the surface of the anode 618, thereby changing the environment of the water-purifying flow path 640 to an acidic condition. If the pH of the water-purifying flow path 640 is lowered to about 5 or less, lead ions ($Pb^{2+}$) adsorbed to the surface functional group (L) may be desorbed by a competing reaction and discharged.

Figure 10:
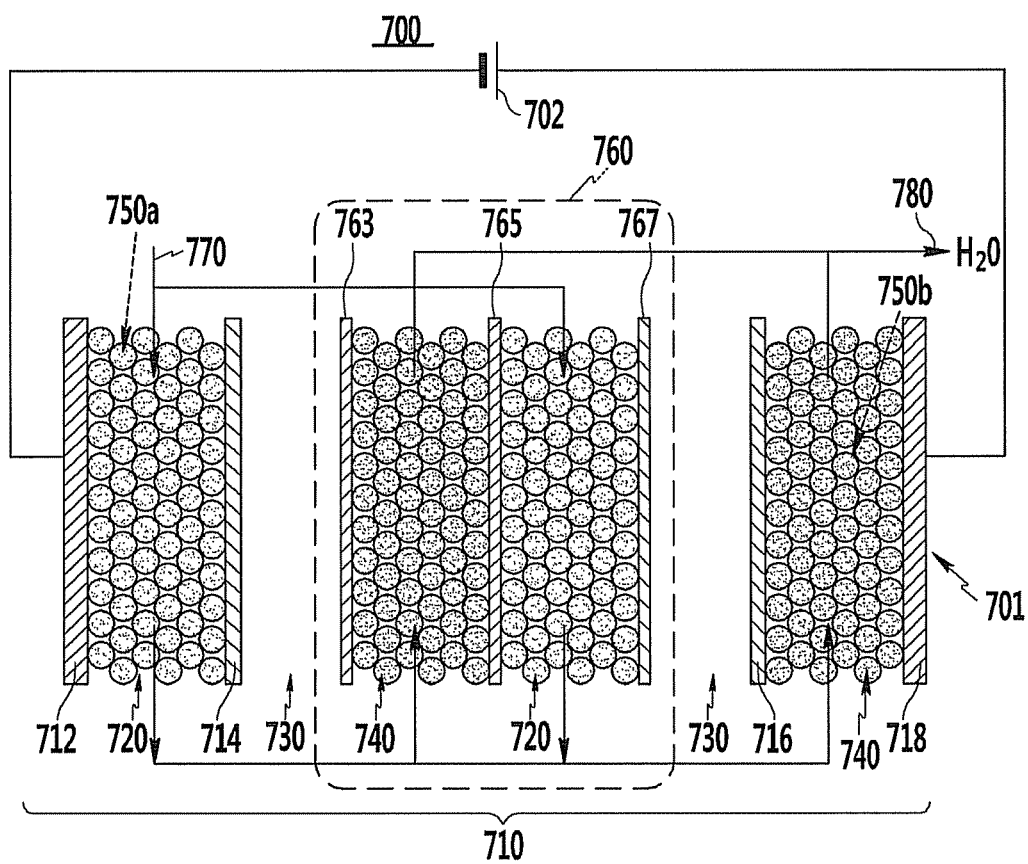
FIG. 10 is a schematic diagram of a filter system according to another example embodiment.

FIG. 10 is a schematic diagram of a filter system 700 according to another example embodiment. The filter system 700 shown in FIG. 10 combines the filter system 100 shown in FIG. 1 and the filter system 600 shown in FIG. 8 so that a first water-purifying flow path 720 may be formed in the cathode chamber and a second water-purifying flow path 740 may be formed in the anode chamber to increase throughput of inflow water per unit hour and remove various kinds of pollutants.

Furthermore, the filter unit 701 may further include a sub-electrode structure 760 between the cation exchange membrane 714 and the anion exchange membrane 716 of the electrode structure 710. At least one sub-electrode structure 760 may be installed. The sub-electrode structure 760 may include the anion exchange membrane (sub-anion exchange membrane) 763, the bipolar membrane 765, and the cation exchange membrane (sub-cation exchange membrane) 767 disposed in that order. Thus, the first water-purifying flow path (first sub-fluid-purifying flow path) 720 may be further provided between the cation exchange membrane 767 and the bipolar membrane 765, and the second water-purifying flow path 740 (second sub-fluid-purifying flow path) may be further provided between the anion exchange membrane 763 and the bipolar membrane 765. The filter system 700 may include two or more pH adjusting chambers 730 by including the sub-electrode structure 760. As explained, throughput per unit hour may be maximized and various kinds of pollutants may be simultaneously removed by adopting at least one sub-electrode structure 760.

The first water-purifying flow path 720 and a first adsorbent 750a filled therein may have substantially equivalent function and constitution to the water-purifying flow path 20 and the adsorbent 50 of the filter system explained with reference to FIG. 1, and the second water-purifying flow path 740 and a second adsorbent 750b filled therein may have substantially equivalent function and constitution to the water-purifying flow path 640 and the adsorbent 650 of the filter system explained with reference to FIG. 8. Reference numeral 702 indicates a voltage applier, 770 indicates an inlet of inflow (untreated) water, and 780 indicates an outlet of treated water.

Figure 11:
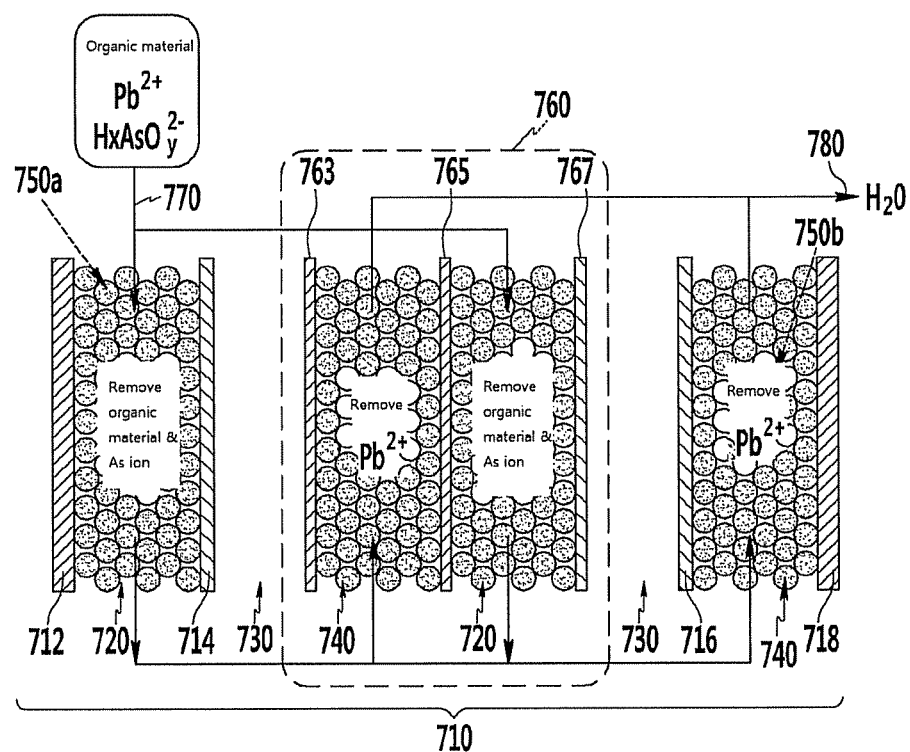
FIG. 11 is a schematic diagram showing the water-purifying step of a filter system according to another example embodiment.
Figure 12:
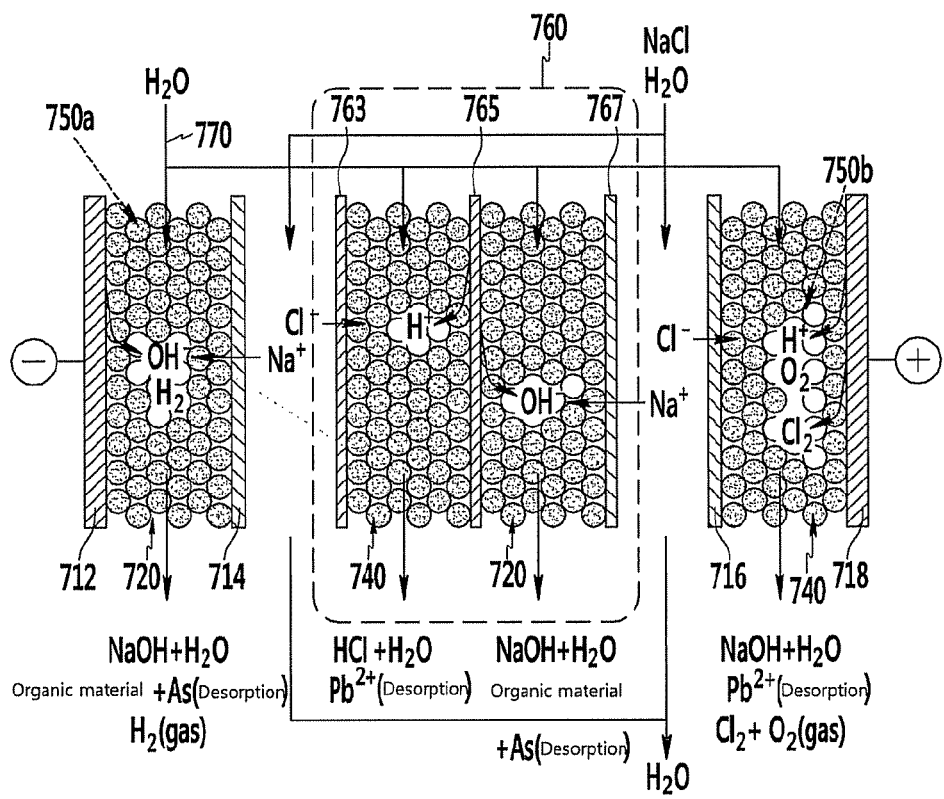
FIG. 12 is a schematic diagram showing the regeneration step of a filter system according to another example embodiment.

FIG. 11 and FIG. 12 are schematic diagrams for explaining a method of driving a filter system 700 according to another example embodiment. FIG. 11 shows a water-purifying step, and FIG. 12 shows a regeneration step.

Referring to FIG. 11, in the water-purifying step, pollutants in the inflow water are removed by adsorption without applying a voltage to the filter system 700. FIG. 11 shows an organic material, arsenic ions in the form of oxyanions ($H_xAsO_y^{2-}$), and lead ions ($Pb^{2+}$) as pollutants in the inflow water, and shows how they are removed to purify the water. Specifically, if inflow water is passed through the first water-purifying flow path 720 filled with the first adsorbent 750a through the inlet 770 of the inflow water, pollutants such as an organic material and arsenic ions in the form of oxyanions are adsorbed to the first adsorbent 750a.

Subsequently, if inflow water passing the first water-purifying flow path 720 is passed through the second water-purifying flow path 740 filled with the second adsorbent 750b, pollutants such as lead ions are adsorbed to the second adsorbent 750b, and then finally treated water that has undergone water-purifying is discharged through the outlet 780. Although it is shown that inflow water passes the first water-purifying flow path 720 first in the drawing, the order is not limited thereto.

Referring to FIG. 12, once the pollutant removal speed decreases after a water-purifying step has progressed for a time, a regeneration step may begin. The determination of the beginning of the regeneration step may be performed similarly to the way explained with reference to FIG. 2. While applying a negative (−) voltage and a positive (+) voltage respectively to the cathode 712 and the anode 718 through the voltage applier 702, inflow water is supplied so that an electrochemical water decomposition reaction may occur. FIG. 12 shows additional supplying an electrolyte (NaCl) to the pH adjusting chamber 730 together with inflow water. In the first water-purifying flow path 720 where a basic condition is formed, an organic material and arsenic ions in the form of oxyanions are desorbed and then discharged together with the basic water. In the second water-purifying flow path 740 where an acidic condition is formed, lead ions are desorbed and then discharged together with the acidic water. Therefore, the first and second water-purifying flow paths 720 and 740 may be regenerated in-situ. Although not shown in the drawing, the basic water and acidic water that are discharged together with desorbed pollutants may be mixed and neutralized so as to reduce environmental problems.

Although not shown in the drawing, a filter unit 701 according to another example embodiment may be modified to have a stacked or tube shape according to the method explained with reference to FIG. 4 to FIG. 6.

Furthermore, the filter unit 701 may be modified so that the water-purifying flow path may be formed in a cathode 712 and/or anode 718, similar to the filter system 500 explained with reference to FIG. 7.

The filter systems according to example embodiments explained with reference to FIG. 1 to FIG. 12 may be combined in various ways and modified into filter systems of various shapes.

Hereinafter, various embodiments are disclosed in more detail with reference to the following examples. However, it should be understood that the following are merely example embodiments and are not limiting as to the scope of the disclosure.

EXPERIMENTAL EXAMPLE

Manufacture of a Chloroform Filter System

A commonly-used activated carbon cloth CH900, a commonly-used cation exchange membrane ASTOM CMX, a commonly-used anion exchange membrane ASTOM AMX, and a commonly-used activated carbon cloth CH900 are cut to about 15×9 $cm^2$, and then sequentially deposited and joined with a screw to manufacture a filter unit. A voltage applier is then connected to manufacture a filter system.

Evaluation of Chloroform Adsorption and Regeneration Performances

The operation of the system is performed at room temperature, and inflow water is prepared such that the concentration of chloroform is about 300 ppb in distilled water. The inflow water is supplied to the water-purifying flow path (cathode chamber) of the filter system at a flow rate of about 2.7 mL/min.

The concentration of residual chloroform is measured over time to confirm the change in chloroform removal capacity, and when the chloroform removal capacity decreases to about 80% or less, a primary regeneration step is performed.

In the primary regeneration step, distilled water is supplied to the water-purifying flow path (cathode chamber) and the anode chamber, and an electrolyte solution including distilled water and NaCl is supplied to the pH adjusting chamber so that the conductivity may become about 19.5 mS/cm. The distilled water and the electrolyte solution are supplied at a flow rate of about 5 mL/min. A constant voltage of about 7 V is applied for about 30 minutes to perform regeneration.

After the regeneration, chloroform inflow water of about 300 ppb is passed again at the same speed and the chloroform removal amount is confirmed to confirm recovery of chloroform removal capacity.

When the chloroform removal capacity decreases again to about 80% or less, a secondary regeneration step is performed.

In the secondary regeneration step, distilled water is supplied to the water-purifying flow path (cathode chamber) and the anode chamber, and an electrolyte solution including distilled water and NaCl is supplied to the pH adjusting chamber so that the conductivity may become about 19.5 mS/cm. The distilled water and the electrolyte solution are supplied at a flow rate of about 5 mL/min. Constant voltages of about 7 V, about 8 V, and about 9 V are sequentially supplied respectively for about 27 minutes, about 12 minutes, and about 1 minute to perform secondary regeneration. The measurement results are shown in FIG. 13.

Figure 13:
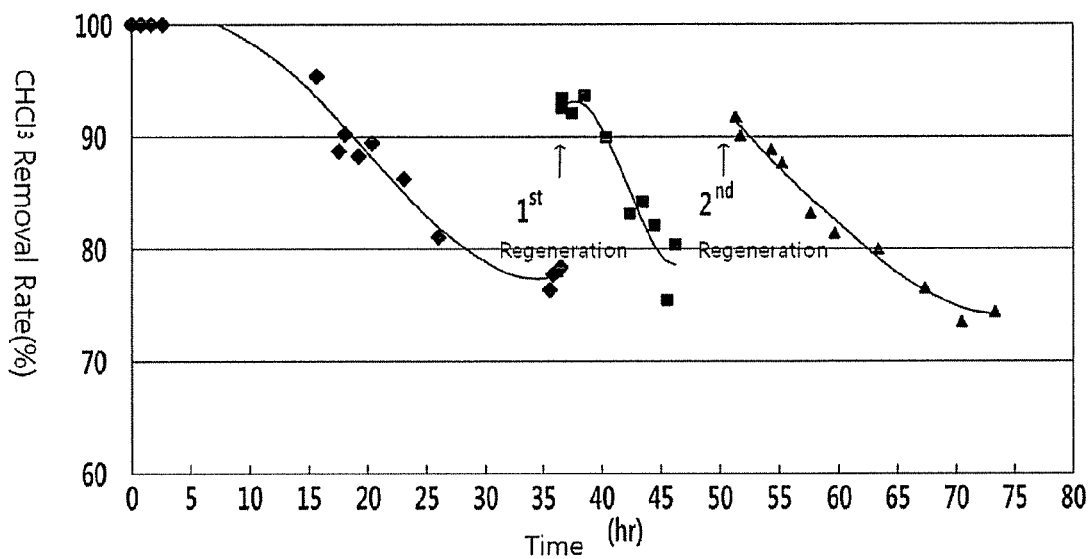
FIG. 13 is a graph showing the evaluation results of the adsorption and regeneration performance of chloroform.

From FIG. 13, it can be seen that chloroform removal rate is recovered by in-situ regeneration. It can be also seen that removal capacity is continuously maintained even if regeneration cycles are repeated.

Manufacture of an Arsenic ion Filter System

A material including $TiO_x$ supported on a commonly-used activated carbon cloth CH900, a commonly-used cation exchange membrane ASTOM CMX, a commonly-used anion exchange membrane ASTOM AMX, and a commonly-used activated carbon cloth CH900 are cut to about 15×9 cm², and then sequentially deposited and joined with a screw to manufacture a filter unit. A voltage applier is then connected to manufacture a filter system.

Evaluation of Arsenic Ion Adsorption and Regeneration Performances

The operation of the system is performed at room temperature, and inflow water is prepared such that the concentration of arsenic ion may be about 3 ppm in distilled water. The inflow water is supplied to the water-purifying flow path (cathode chamber) of the filter system at a flow rate of about 10 mL/min.

The concentration of residual arsenic ions in treated water is measured over time to confirm change in removal capacity of arsenic ion, and if the arsenic ion removal capacity decreases to about 20%, a regeneration step is performed.

In the regeneration step, distilled water is supplied to the water-purifying flow path (cathode chamber) and the anode chamber, and an electrolyte solution including distilled water and NaCl is supplied to the pH adjusting chamber such that the conductivity may become about 19.5 mS/cm. The distilled water and the electrolyte solution are supplied at a flow rate of about 5 mL/min. A constant voltage of about 7 V is supplied for about 60 minutes to perform regeneration. The measurement results are shown in FIG. 14.

Figure 14:
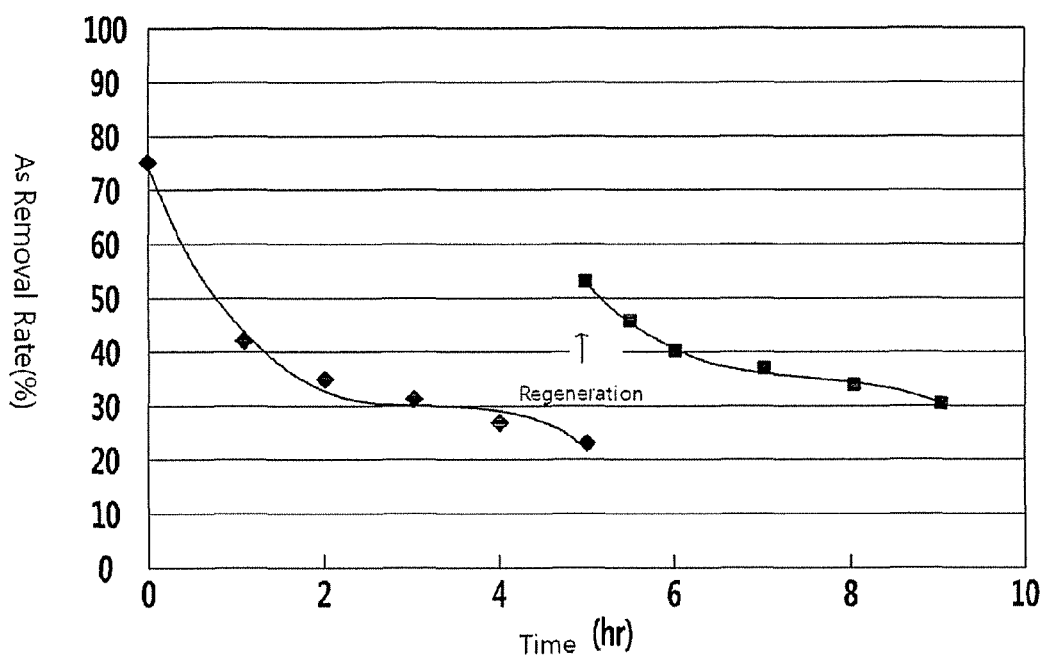
FIG. 14 is a graph showing the evaluation results of the adsorption and regeneration performance of arsenic ions.

From FIG. 14, it can be seen that arsenic ion removal rate is recovered by in-situ regeneration.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

<Description of Symbols>

| | |
|---|---|
| 1: filter unit | 2: voltage applier |
| 10: electrode structure | 12: cathode |
| 14: cation exchange membrane | 16: anion exchange membrane |
| 18: anode | 20: water-purifying flow path |
| 30: pH adjusting chamber | 40: anode chamber |
| 50: adsorbent | 501: filter unit |
| 502: voltage applier | 510: electrode structure |
| 512: cathode | 514: cation exchange membrane |
| 516: anion exchange membrane | 518: anode |
| 520: water-purifying flow path | 530: pH adjusting chamber |
| 540: anode chamber | 601: filter unit |
| 602: voltage applier | 610: electrode structure |
| 612: cathode | 614: cation exchange membrane |
| 616: anion exchange membrane | 618: anode |
| 620: cathode chamber | 630: pH adjusting chamber |
| 640: water-purifying flow path | 650: adsorbent |
| 701: filter unit | 702: voltage applier |
| 710: electrode structure | 712: cathode |
| 714: cation exchange membrane | 716: anion exchange membrane |
| 718: anode | 720: first water-purifying flow path |
| 730: pH adjusting chamber | 740: second water-purifying flow path |
| 750a: first adsorbent | 750b: second adsorbent |
| 760: sub-electrode structure | 763: anion exchange membrane |
| 765: bipolar membrane | 767: cation exchange membrane |

What is claimed is:

1. A filter unit comprising:
   an electrode structure including a cathode, a cation exchange membrane, an anion exchange membrane, and an anode, the cation exchange membrane disposed between the cathode and the anion exchange membrane, the anion exchange membrane disposed between the cation exchange membrane and the anode;
   a fluid-purifying flow path being at least one of a path defined by an inner surface of the cathode, a path defined by the cathode and the cation exchange membrane, a path defined by the anion exchange membrane and the anode, and a path defined by the anode;
   a pH adjusting chamber defined by the cation exchange membrane and the anion exchange membrane, the pH adjusting chamber configured to control a pH of a fluid in the fluid-purifying flow path;
   an adsorbent in the fluid-purifying flow path and not in the pH adjusting chamber; and
   at least one sub-electrode structure between the cation exchange membrane and the anion exchange membrane, the sub-electrode structure including a sub-anion exchange membrane, a bipolar membrane, and a sub-cation exchange membrane defining at least one sub-fluid-purifying flow path therebetween, the bipolar membrane being between the sub-anion exchange membrane and the sub-cation exchange membrane.

2. The filter unit of claim 1, wherein the cathode and the anode are formed of a material configured to induce a water decomposition reaction.

3. The filter unit of claim 1, wherein the adsorbent is composed of a material that is different from or identical to a material of at least one of the cathode and anode.

4. The filter unit of claim 3, wherein the adsorbent is in the fluid-purifying flow path contacting the cathode, the adsorbent configured to desorb a pollutant under a basic condition.

5. The filter unit of claim 3, wherein the adsorbent is in the fluid-purifying flow path contacting the anode, the adsorbent configured to desorb a pollutant under an acidic condition.

6. A filter system comprising:
   a filter unit including an electrode structure, a fluid-purifying flow path, a pH adjusting chamber, at least one sub-electrode structure, and a adsorbent in the fluid-purifying flow path and not in the pH adjusting chamber;
   the electrode structure including a cathode, a cation exchange membrane, an anion exchange membrane, and an anode, the cation exchange membrane disposed between the cathode and the anion exchange membrane, the anion exchange membrane disposed between the cation exchange membrane and the anode;
   the fluid-purifying flow path being at least one of a path defined by an inner surface of the cathode, a path defined by the cathode and the cation exchange membrane, a path between the anion exchange membrane and the anode, and a path defined by the anode, the pH adjusting chamber defined by the cation exchange membrane and the anion exchange membrane, the pH adjusting chamber configured to control a pH of a fluid in the fluid-purifying flow path;

the at least one sub-electrode structure disposed between the cation exchange membrane and the anion exchange membrane, the sub-electrode structure including a sub-anion exchange membrane, a bipolar membrane, and a sub-cation exchange membrane defining at least one sub-fluid-purifying flow path therebetween, the bipolar membrane being between the sub-anion exchange embrane and the sub-cation exchange membrane; and a voltage applier configured to apply a voltage to the cathode and the anode.

7. The filter system of claim 6, wherein the cathode and the anode are formed of a material configured to induce a water decomposition reaction.

8. The filter system of claim 6, wherein the adsorbent is composed of a material that is different from or identical to a material of at least one of the cathode and the anode.

9. The filter system of claim 8, wherein the adsorbent is in the fluid-purifying flow path contacting the cathode, the adsorbent configured to desorb a pollutant under a basic condition.

10. The filter system of claim 8, wherein the adsorbent is in the fluid-purifying flow path contacting the anode, the adsorbent configured to desorb a pollutant under an acidic condition.

11. A method of driving a filter system, the method comprising:

purifying a fluid by passing an inflow through a fluid-purifying flow path of a filter unit of the filter system, the filter unit including an electrode structure, the fluid-purifying flow path, and a pH adjusting chamber, at least one sub-electrode structure, and an adsorbent in the fluid-purifying flow path and not in the pH adjusting chamber, the electrode structure including a cathode, a cation exchange membrane, an anion exchange membrane and an anode, the cation exchange membrane disposed between the cathode and the anion exchange membrane, te anion exchange membrane disposed between the cation exchange membrane and the anode, the fluid-purifying flow path being at least one of a path defined by an inner surface of the cathode, a path defined by the cathode and the cation exchange membrane, a path defined by the anion exchange membrane and the anode, and a path defined by the anode, the pH adjusting chamber defined by the cation exchange membrane and the anion exchange membrane, the pH adjusting chamber configured to control a pH of the fluid in the fluid-purifying flow path, the at least one sub-electrode structure disposed between the cation exchange membrane and the anion exchange membrane, the sub-electrode structure including a sub-anion exchange membrane, a bipolar membrane, and a sub-cation exchange membrane defining at least one sub-fluid-purifying flow path therebetween, the bipolar membrane being between the sub-anion exchange membrane and the sub-cation exchange membrane;and regenerating the fluid-purifying flow path by applying a voltage to the cathode and the anode while supplying water through the electrode structure.

12. The method of claim 11, wherein the regenerating the fluid-purifying flow path applies the voltage to the cathode and the anode formed of a material that induces a water decomposition reaction.

13. The method of claim 11, wherein the adsorbent is composed of a material that is different from or identical to a material of at least one of the cathode and the anode.

14. The method of claim 13, wherein the regenerating the fluid-purifying flow path includes disposing the adsorbent in the fluid-purifying flow path contacting the cathode, the adsorbent configured to desorb a pollutant under a basic condition.

15. The method of claim 13 wherein the regenerating the fluid-purifying flow path includes disposing the adsorbent in the fluid-purifying flow path contacting the anode, the adsorbent configured to desorb a pollutant under an acidic condition.

16. The method of claim 11, wherein the regenerating the fluid-purifying flow path includes inducing water decomposition in the cathode and the anode with the voltage.

17. The method of claim 16, wherein the regenerating the fluid-purifying flow path includes introducing an electrolyte to the pH adjusting chamber, the electrolyte supplying ions required for pH control.

\* \* \* \* \*